United States Patent [19]
Belanger et al.

[11] Patent Number: 5,511,272
[45] Date of Patent: Apr. 30, 1996

[54] PRE-ENGINEERED FAILURE LINK FOR BRUSH SHAFT

[75] Inventors: Michael J. Belanger, Walled Lake; Robert J. Wentworth, Farmington Hills, both of Mich.

[73] Assignee: Belanger, Inc., Northville, Mich.

[21] Appl. No.: 352,657

[22] Filed: Dec. 9, 1994

[51] Int. Cl.⁶ .................................................. B60S 3/06
[52] U.S. Cl. .......................... 15/53.3; 15/DIG. 2; 403/2
[58] Field of Search ...................... 15/53.2, 53.3, 15/53.1, 97.3, DIG. 2; 403/2; 464/32, 87

[56] References Cited

U.S. PATENT DOCUMENTS

| | | | |
|---|---|---|---|
| 4,198,722 | 4/1980 | Ennis | 15/53.3 |
| 4,513,467 | 4/1985 | Roncaglione | 15/53.3 |
| 4,628,562 | 12/1986 | Roncaglione | 15/53.3 |

*Primary Examiner*—Edward L. Roberts, Jr.
*Attorney, Agent, or Firm*—Young, MacFarlane & Wood

[57] ABSTRACT

A sacrificial link is disclosed for the shaft of a vehicle-cleaning brush unit, which link is pre-engineered to fail prior to the remainder of the shaft in response to bending forces exerted on the brush by a vehicle, for example. The shaft itself is therefore protected from permanent deformation or breakage, while the sacrificial link is easily removed and replaced with relatively little downtime and expense. In a preferred form the sacrificial link comprises a sacrificial shaft section having socket ends for removable connection to the upper portion of a brush shaft depending from a motor drive unit and the lower portion of the brush shaft connected to the brush, and a center region pre-engineered to fail before the upper and lower brush shaft sections. Novel clamping and release structure associated with the socket ends of the sacrificial shaft section is also disclosed.

13 Claims, 2 Drawing Sheets

5,511,272

PRE-ENGINEERED FAILURE LINK FOR BRUSH SHAFT

FIELD OF THE INVENTION

The present invention relates to rotary brush units used in vehicle washes and the like. More specifically, the present invention relates to a brush shaft designed such that, under external force, permanent deformation is limited to a predetermined portion which can be easily removed and replaced without having to disassemble the entire brush unit.

BACKGROUND OF THE INVENTION

A common problem in rotary brush units used in vehicle washes is the permanent deformation or breakage of the brush shaft. Frequently, vehicles which stray from the proper path or track or which are too large or driven too fast run into the brushes with excessive force, causing the brush shaft to bend or break.

A typical prior art overhead brush unit 10 shown in FIG. 1 comprises a motor drive unit, drive/support shaft, and brush. The rotating drive shaft 20 is suspended at its upper end 20a from an overhead, motorized drive unit 15. A brush 18 is attached to the shaft at its lower end 20b to rotate with the shaft. Though made of steel or a similar strong material, the drive shaft 20 can be bent when, for example, an automobile 1 runs into the brush 18. If the force of the collision is great enough, shaft 20 can be permanently bent or even broken at a bending moment region 27 between the brush and the drive unit. This type of damage requires disassembly of the entire brush unit 10 in order to replace the damaged shaft; removing the shaft from the drive unit is a particularly labor intensive operation. Such damage is also expensive from the standpoint of both replacement shaft cost and downtime during which the brush unit, and often the entire wash, is inoperative.

SUMMARY OF THE INVENTION

In the present invention the expense of replacing a bent or broken shaft is eliminated through the use of a sacrificial link, detachably interposed between first and second portions of the rotating brush shaft. This link is designed to permanently deform or break prior to the remainder of the shaft. To accomplish this, the sacrificial link is preferably incorporated between the first and second shaft portions at a point where the shaft is expected to experience significant bending moment in response to external force. The preferred form of this invention is further characterized by a sacrificial link having a center region whose diameter is smaller than the diameter of either the first or second shaft portions, making it significantly weaker and the first to bend. Once permanently deformed, the sacrificial link is easily replaced with a minimum of downtime and expense.

In a vehicle-cleaning brush unit having a brush-supporting shaft depending from a support unit, the brush shaft comprises separate first and second shaft portions connected to the brush and motor drive unit, respectively, and the sacrificial link is removably connected to the first and second shaft portions.

The sacrificial link in one form comprises a sacrificial shaft section having two ends connected to the first and second shaft portions of the brush unit, and a center region pre-engineered to fail before the first and second shafts by virtue of a reduced diameter. The ends of the sacrificial shaft section and the reduced diameter center region are preferably connected by regions of tapered diameter. The ends can include sockets whose diameter is approximately equal to the diameter of the first and second shaft portions.

In a further form of the invention the socket ends of the sacrificial shaft section are divided into clamping halves for improved, shear-resistant coupling to the rotating shaft portions. The socket ends preferably further include a tap hole to assist in removing a shaft section clamped therein should the parts become stuck or corroded.

DETAILED DESCRIPTION OF THE ILLUSTRATED EMBODIMENT

Figure 1:
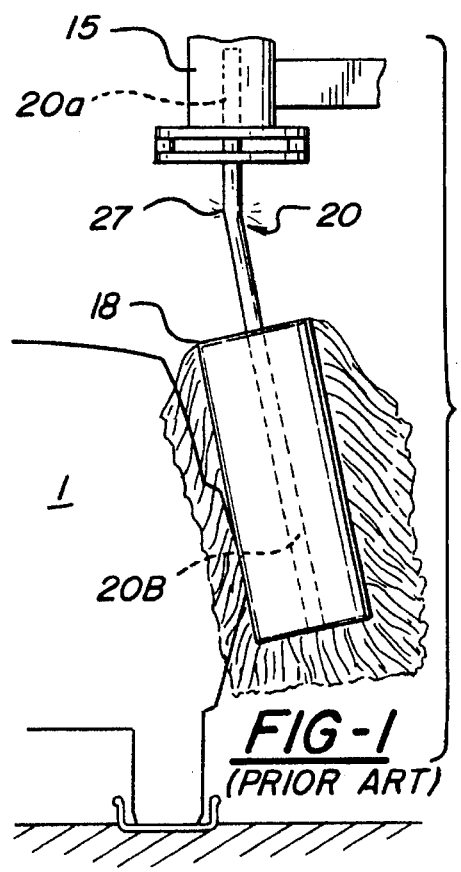
FIG. 1 depicts a prior art brush assembly and shaft being bent by an automobile.

FIG. 1 shows a typical prior art brush unit 10. As depicted, it includes a shaft 20 suspended at its upper region 20a by an overhead drive unit 15. A brush 18 is suspended from the opposite end 20b of shaft 20. Excessive force imposed on brush 18 by, for example, an automobile 1 can cause permanent deformation or breakage of the shaft 20. Because the shaft and brush are freely suspended from the drive unit 15, the bending moment is concentrated at a point 27 near the drive unit. Since the shaft is connected to both the drive unit 15 and brush 18, repair of the bent or broken shaft requires disassembly of the entire brush unit 10.

Figure 2:
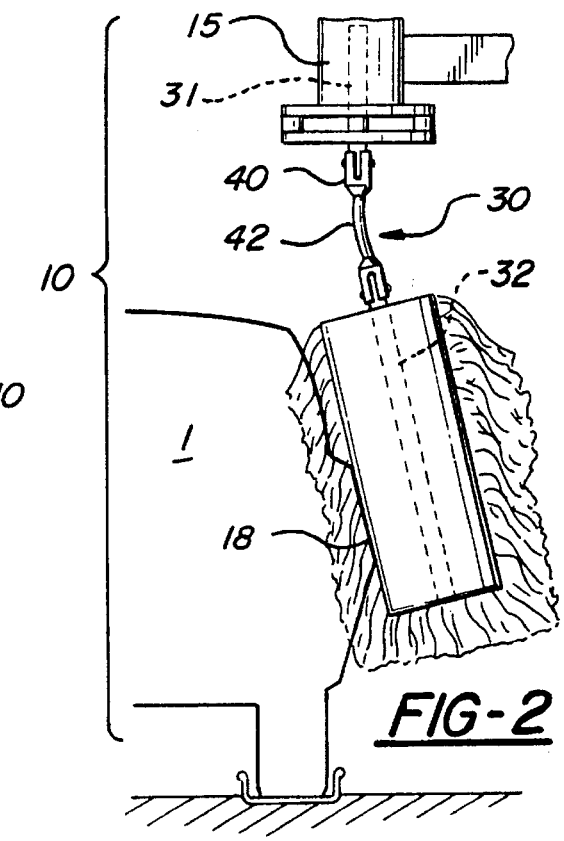
FIG. 2 illustrates a sacrificial brush shaft link according to the present invention, as it is incorporated into a brush shaft, also being bent.

In the present invention, shown in FIG. 2, the rotating shaft 30 of the overhead brush unit 10 comprises three distinct portions: an upper shaft portion 31, connected to and protruding from the drive unit 15; a second shaft portion 32, connected to and protruding from the brush 18; and a sacrificial link 40 removably connected to the free ends of upper and lower shaft portions 31,32 to form a unitary drive/support shaft. Sacrificial link 40 is located where the greatest bending moment is anticipated, in the illustrated embodiment near drive unit 15 at a pre-engineered failure area 42.

This three-piece shaft structure alleviates problems of both downtime and replacement cost when repairing damaged brush shafts. Since excessive force on the brush 18 focuses the greatest bending moment at pre-engineered failure area 42 of the sacrificial link 40 between the first and second shaft portions 31, 32, deformation or breakage of the shaft 30 is limited to the sacrificial link 40, an easily replaceable element.

Figure 3:
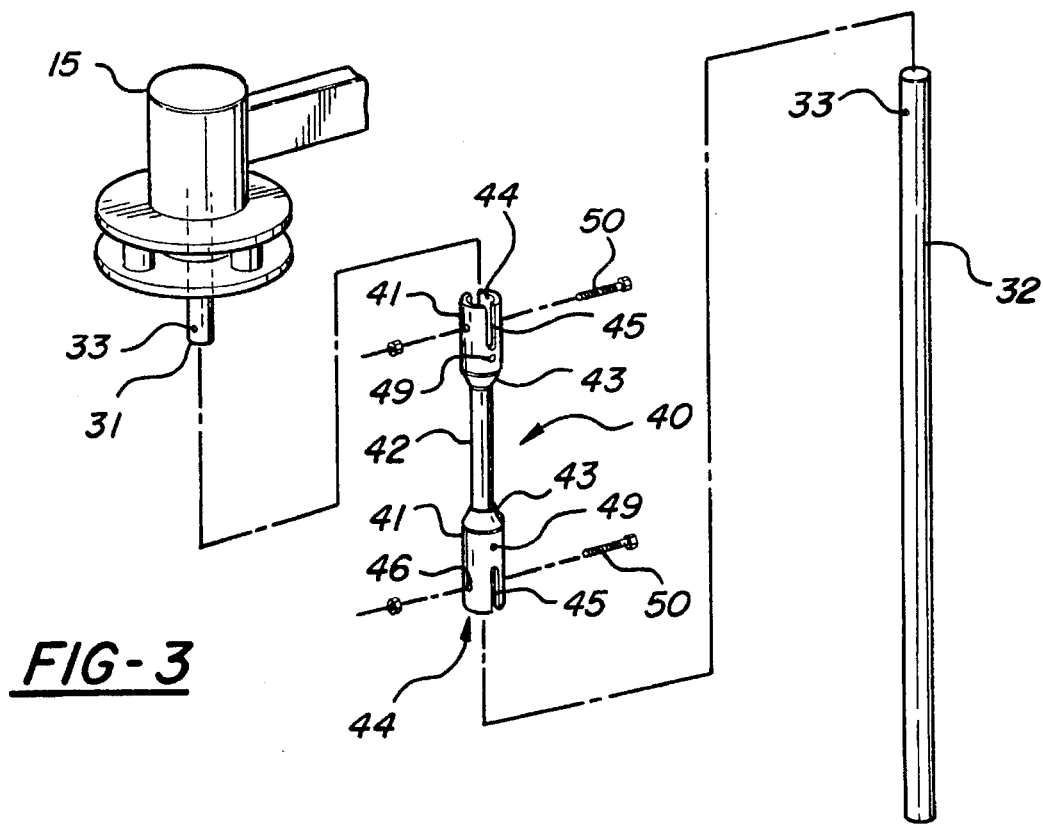
FIG. 3 is an exploded perspective view of the sacrificial link and brush shaft of FIG. 2.
Figure 4:
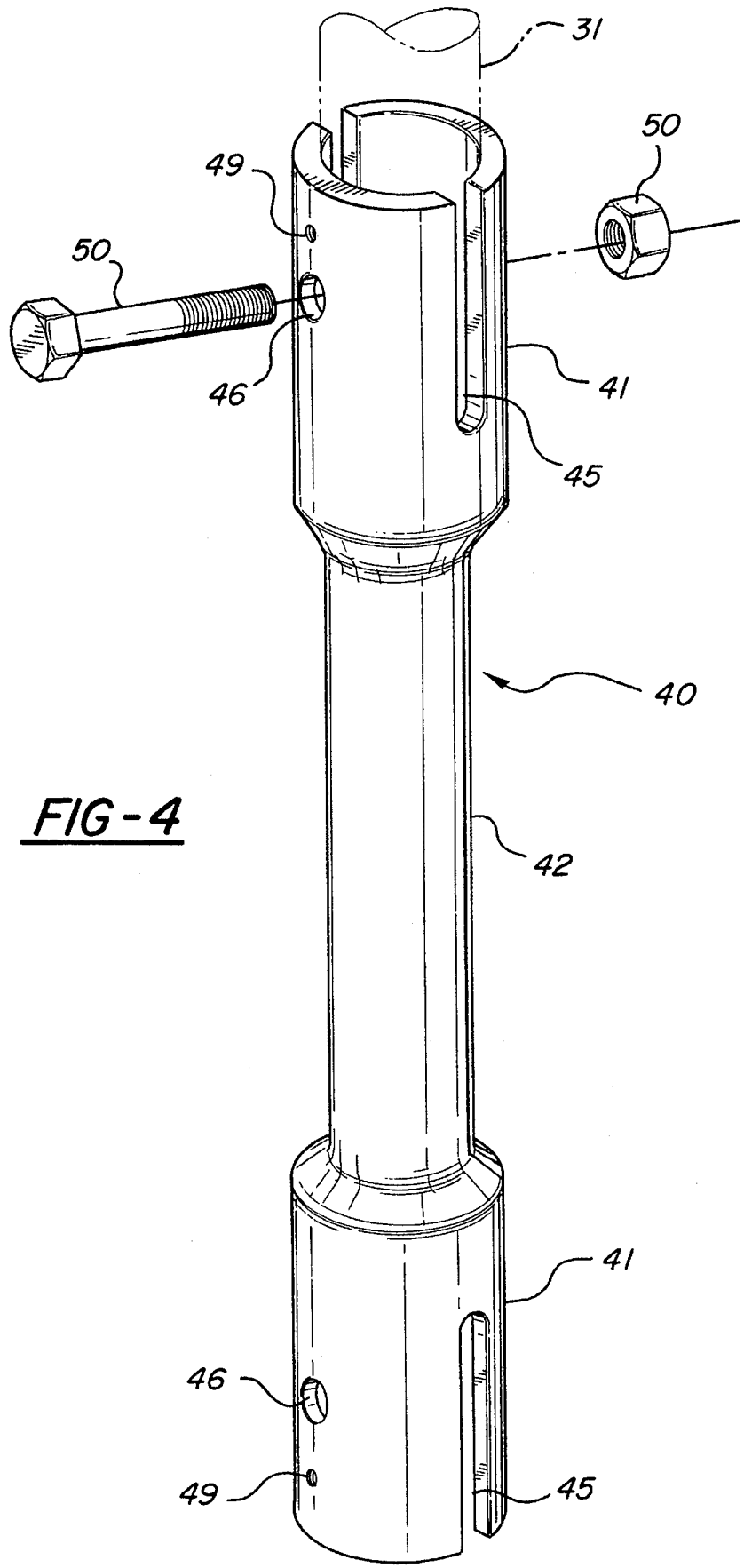
FIG. 4 is a more detailed perspective view of the sacrificial link of FIG. 2, showing its connections with a brush shaft in phantom.

Referring now to FIGS. 3 and 4, the structure and function of the present invention is illustrated in greater detail. The sacrificial link 40 is generally cylindrical in shape, comprising a reduced diameter center region 42 and spaced, opposing ends 41. The center region 42 is solid, while each end region 41 includes a socket 44 for receiving a free end of the upper or lower shaft portions 31,32 of the brush unit. Each socket 44 has an inner diameter approximating the outer diameter of the upper and lower shaft portion received therein. In the illustrated embodiment, upper and lower shaft portions 31 and 32 are the same diameter and sockets 44 are accordingly identical. This symmetrical, reversible arrangement is preferred since it reduces cost and simplifies installation and replacement. It is possible, however, to use upper and lower shaft portions of different diameter or shape, and correspondingly different sockets 44 at the ends of the sacrificial link 40.

The circumferential socket wall of each end 41 includes a pair of opposed slots 45 extending from the end of each socket 44 downward along the long axis of the link 40. These slots effectively divide each socket wall into clamping halves to facilitate the secure attachment of the link 40 to the upper and lower shaft portions 31, 32 of the brush unit.

Each socket 44 also includes bolt through-holes 46, extending through the wall of each clamping half. Through-holes 46 are aligned along an axis perpendicular to the long axis of the link 40 and the plane of slots 45. Upper and lower shaft portions 31,32 include matching bolt through-holes 33 at their free ends. The sockets 44 in each end 41 of the link 40 are formed or milled to a depth permitting the alignment of through-holes 46 and through-holes 33 when each end 41 of link 40 is connected to the upper and lower shaft portions.

Link 40 in the illustrated embodiment is approximately twelve to fourteen inches in length and about two inches in diameter at its widest point (ends 41). It will be understood that other lengths and diameters can be used to accommodate brush-unit shafts of varying lengths and diameters.

While each of the socket ends 41 has an outside diameter of approximately two inches, the center region 42 is characterized by a reduced diameter, in the illustrated embodiment approximately 1.25 inches. The transition region from each socket end to the reduced diameter center region of link 40 is defined by a solid tapered shoulder region 43, in the illustrated embodiment approximately ½ inch in length. Other taper lengths are possible, depending on the desired deflection and strength characteristics of link 40 and its overall dimensions. However, the deflection characteristics of link 40 with the illustrative ½ inch taper have been determined to be preferred for the link dimensions recited above.

Upper and lower shaft portions 31,32 are preferably manufactured from solid rods of steel, for example 7075 steel, while the sacrificial link 40 in the illustrated embodiment is milled from a rod of commercially available steel known as "Stressproof". The following tables illustrate the deflection characteristics of this material in link 40 according to the invention versus those in a one-piece prior art brush shaft:

| STANDARD 7075 STEEL SHAFT (Prior Art) | | |
| --- | --- | --- |
| Force Applied | Deflection Under Load | Permanent Set Deflection |
| 400 psi | 14" | 0.5" |
| 500 psi | 19.5" | 1" |
| 550 psi | 23" | 1.5" |
| 600 psi | 25.5" | 2.5" |

| SHAFT WITH 1¼" DIAMETER STRESSPROOF LINK WITH ½" TAPER | | |
| --- | --- | --- |
| Force Applied | Deflection Under Load | Permanent Set Deflection |
| 300 psi | 7.5" | 0.25" |
| 400 psi | 11" | 0.5" |
| 500 psi | 14" | 0.75" |
| 600 psi | 17.25" | 2.75" |

The illustrative dimensions above result in a sacrificial link 40 whose bending strength is approximately 20%–30% less than that of shaft portions 31,32. This range has been found to provide an optimum balance between failure threshold and overall brush unit performance under normal operating conditions and forces.

Of course, various grades of steel and even other metal alloys may be used to practice the present invention. In addition, shafts of varying diameters are also possible. The following tables illustrate the deflection characteristics of some alternative diameters and materials tested for the sacrificial link described above, with the diameter given for the reduced center section 42:

| 1½" DIA HRS | | |
| --- | --- | --- |
| Force Applied | Deflection Under Load | Permanent Set Deflection |
| 200 psi | 3.75" | 0.25" |
| 300 psi | 6" | 0.75" |
| 400 psi Quit | 9" | 1.5" |

| 1½ x ¼ WALL THICKNESS HRS TUBING | | |
| --- | --- | --- |
| Force Applied | Deflection Under Load | Permanent Set Deflection |
| 200 psi | 3.25" | 0 |
| 300 psi | 6" | 0.25" |
| 400 psi | 8.5" | 0.75" |
| 500 psi | 11.5" | 1.5" |
| 600 psi Quit | 18.5" | 6.25" |

| 1⅜" DIA STRESSPROOF | | |
| --- | --- | --- |
| Force Applied | Deflection Under Load | Permanent Set Deflection |
| 200 psi | 3.25" | 0 |
| 300 psi | 5.75" | 0 |
| 400 psi | 8.25" | 0 |
| 500 psi | 10" | 0.75" (0)* |
| 600 psi Quit | 18" | 3" (0)* |

*indicates clamping half failure

| 1" DIA STRESSPROOF | | |
| --- | --- | --- |
| Force Applied | Deflection Under Load | Permanent Set Deflection |
| 200 psi | 7.75" | 0.25" |
| 300 psi | 14.5" | 2" |

1" DIA STRESSPROOF

| Force Applied | Deflection Under Load | Permanent Set Deflection |
| --- | --- | --- |
| Quit | | |

2" DIA 6061-T6 ROD

| Force Applied | Deflection Under Load | Permanent Set Deflection |
| --- | --- | --- |
| 200 psi | 3.5" | 0.75" |
| 300 psi | 6.25" | 1" |
| 400 psi | 9.75" | 2.5" |
| 500 psi | 13.25" | 4" |
| Quit | | |

In operation, the sacrificial link 40 is detachably connected by socket ends 41 to the upper and lower brush unit shaft portions 31,32. As indicated above, the depth of each socket 44 in ends 41 is such that through-holes 46 can be aligned with each of the corresponding through-holes 33 in the upper and lower shaft sections. To insure a secure engagement between the sacrificial link and each of the first and second shaft portions, a nut and bolt assembly 50 is fastened through each bore defined by aligned through-holes 46 and 33. The slots 45 in the circumferential walls of each socket end 41 permit the halves of each socket end to be clamped together upon tightening of the nuts and bolts 50, securely clamping link 40 to shaft portions 31,32 during normal brush operation. This clamping arrangement eliminates shear forces on bolt 50, resulting in a stronger connection.

The vehicle wash environment in which brush shaft 30 operates is often a corrosive one, and can cause the ends of shaft portions 31,32 to become locked in sockets 44 even after bolts 50 are removed. Socket ends 41 are accordingly provided with tap holes 49 through which a bolt can be threaded into contact with the stuck shaft. Advancing the bolt against the shaft in socket end 41 separates the stuck parts.

It will be understood that the foregoing is merely an illustrative embodiment of the invention. Various other changes and alterations, apparent to those skilled in the art, can be made without departing from the scope of the following claims:

We claim:

1. In a vehicle-cleaning brush unit having a brush-supporting shaft depending from a support unit, an improved shaft structure comprising:

a brush shaft comprising separate first and second shaft portions connected to a brush and a support unit, respectively, and a removable sacrificial link connecting the first and second shaft portions to permanently deform under external bending load prior to the first and second shaft portions.

2. Apparatus as defined in claim 1, wherein the sacrificial link comprises a sacrificial shaft section having two opposing ends connected to the first and second shaft portions, and a center region pre-engineered to fail before the first and second shaft portions.

3. Apparatus as defined in claim 2, wherein the center region of the sacrificial shaft section includes a region of reduced diameter.

4. Apparatus as defined in claim 3, wherein the ends of the sacrificial link have a diameter greater than that of the center region, and further include regions of tapered diameter between the opposing ends and the center region.

5. Apparatus as defined in claim 4, in which each opposing end includes a socket the inner diameter of which is approximately equal to the diameter of each of the first and second shaft portions.

6. Apparatus as defined in claim 5, in which each of the socket end regions is divided into clamping halves.

7. Apparatus as defined in claim 6, wherein the socket end regions include a clamping slot extending approximately the longitudinal length of the end region.

8. Apparatus as defined in claim 7, wherein the sockets in the opposing ends and the upper and lower shaft portions include through-holes aligned to define a throughbore when each of the first and second shafts is connected to one of the sockets, further including a bolt extending through the throughbore to clamp the socket clamping halves to the shaft sections.

9. Apparatus as defined in claim 8, wherein each socket end region of the sacrificial link includes a tap hole.

10. In a vehicle-cleaning brush unit having a brush-supporting shaft depending from a motor drive unit, an improved shaft structure comprising:

a first shaft portion connected to the drive unit;

a second shaft portion connected to the brush;

a sacrificial link removably connected to the first and second shaft portions, the sacrificial link designed to permanently deform in response to external force on the shaft prior to either of the first or second shaft portions.

11. Apparatus as defined in claim 10, wherein the sacrificial link comprises a sacrificial shaft section having ends of a first diameter, sockets in the ends for removable connection to the first and second shaft portions, and a center region of a second diameter less than the first diameter.

12. Apparatus as defined in claim 11, wherein the first and second shaft portions are of a third diameter less than the first diameter and greater than the second diameter.

13. Apparatus as defined in claim 12, wherein the sacrificial shaft section further includes solid tapered regions between the ends and the center region.

* * * * *

UNITED STATES PATENT AND TRADEMARK OFFICE
CERTIFICATE OF CORRECTION

PATENT NO. : 5,511,272
DATED : April 30, 1996
INVENTOR(S) : Belanger et al.

It is certified that error appears in the above-indentified patent and that said Letters Patent is hereby corrected as shown below:

Column 2, line 8, delete "section" and insert --portion--.

Signed and Sealed this

Fifteenth Day of October, 1996

BRUCE LEHMAN

*Attest:*

*Attesting Officer*   *Commissioner of Patents and Trademarks*